United States Patent
Shah et al.

(10) Patent No.: US 8,327,028 B1
(45) Date of Patent: Dec. 4, 2012

(54) METHOD AND APPARATUS FOR PROVIDING TIME SYNCHRONIZATION IN A DATA PROTECTION SYSTEM

(75) Inventors: Dharmesh Shah, San Jose, CA (US); Gopal Sharma, San Jose, CA (US); Grizel Lopez, Sunnyvale, CA (US); Abhay Kumar Singh, Sunnyvale, CA (US); Taher Vohra, Sunnyvale, CA (US); Srikant Sharma, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 589 days.

(21) Appl. No.: 12/235,295

(22) Filed: Sep. 22, 2008

(51) Int. Cl.
*G06F 15/16* (2006.01)
(52) U.S. Cl. .......... 709/248; 707/674; 713/503
(58) Field of Classification Search .......... 709/248, 709/203, 217, 219–221, 223, 246; 707/618, 707/674–686; 340/3.2, 3.3–3.32; 713/375, 713/500–503
See application file for complete search history.

(56) References Cited

U.S. PATENT DOCUMENTS

| | | | |
|---|---|---|---|
| 6,731,600 B1 * | 5/2004 | Patel et al. | 370/230 |
| 2002/0039370 A1 * | 4/2002 | Elliot | 370/503 |
| 2004/0010487 A1 * | 1/2004 | Prahlad et al. | 707/1 |
| 2005/0240813 A1 * | 10/2005 | Okada et al. | 714/14 |
| 2006/0282510 A1 * | 12/2006 | Preimesberger | 709/217 |
| 2007/0198706 A1 * | 8/2007 | Mechelli et al. | 709/224 |
| 2007/0255823 A1 * | 11/2007 | Astley et al. | 709/224 |
| 2007/0260717 A1 * | 11/2007 | Kano | 709/223 |
| 2007/0268938 A1 * | 11/2007 | Dowd | 370/509 |
| 2007/0282921 A1 * | 12/2007 | Atluri et al. | 707/202 |
| 2008/0049743 A1 * | 2/2008 | Zampetti | 370/389 |
| 2009/0041053 A1 * | 2/2009 | Birmiwal et al. | 370/468 |
| 2009/0157469 A1 * | 6/2009 | D'Urso et al. | 705/9 |
| 2009/0282203 A1 * | 11/2009 | Haustein et al. | 711/162 |
| 2009/0327445 A1 * | 12/2009 | Van Rietschote et al. | 709/213 |
| 2010/0034103 A1 * | 2/2010 | Froehlich et al. | 370/252 |

\* cited by examiner

*Primary Examiner* — Philip Chea
*Assistant Examiner* — Eric W Shepperd
(74) *Attorney, Agent, or Firm* — Wilmer Cutler Pickering Hale and Dorr LLP

(57) ABSTRACT

A method and apparatus for synchronizing time within a data protection system is described. In one embodiment, the method includes processing input/output activity information associated with at least one client computer, wherein the input/output activity information comprises at least one local client timestamp, determining at least one server timestamp for the at least one local client timestamp and modifying the input/output activity information with the at least one server timestamp.

18 Claims, 3 Drawing Sheets

METHOD AND APPARATUS FOR PROVIDING TIME SYNCHRONIZATION IN A DATA PROTECTION SYSTEM

BACKGROUND OF THE INVENTION

1. Field of the Invention

Embodiments of the present invention generally relate to a data protection system and, more particularly, to a method and apparatus for providing time synchronization in a data protection system.

2. Description of the Related Art

A typical organization may employ a data protection system to backup and restore mission critical data. For example, the mission critical data may be transmitted from a computing environment (e.g., a plurality of client computers) and stored at a remote site (e.g., a plurality of data storage devices). The data as well as one or more operations (e.g., storage and/or file system operations) may be stored as a backup image and an input/output journal.

If a disaster (e.g., power failure, data corruption, flash flood and/or the like) strikes the computing environment and destroys data, the mission critical data is recovered from the backup image and the input/output journal at the remote site. For example, an administrator may restore the mission critical data with the backup image that corresponds with the point-in-time right before the disaster struck. In other instances (e.g., a lost file), the administrator may restore the mission critical data at any point-in-time.

In order to ensure that the correct point-in-time is chosen, the time at the remote site and the computing environment must be synchronized. If the respective times are not synchronized, then inconsistencies occur during the recovery of the mission critical data. As a result, an inaccurate storage state is recreated at the computing environment. For example, if the time is skewed by five seconds, then data that was modified during the five second time period may not be restored to the computing environment.

Therefore, there is a need in the art of a method and apparatus for synchronizing time within a data protection system, such as a continuous data protection system (CDP), to facilitate accurate storage state recreation.

SUMMARY OF THE INVENTION

Embodiments of the present invention generally comprise a method and apparatus for synchronizing time within a data protection system. In one embodiment, a method for synchronizing time within a data protection system, comprises processing input/output activity information associated with at least one client computer, wherein the input/output activity information comprises at least one local client timestamp, determining at least one server timestamp for the at least one local client timestamp and modifying the input/output activity information with the at least one server timestamp.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
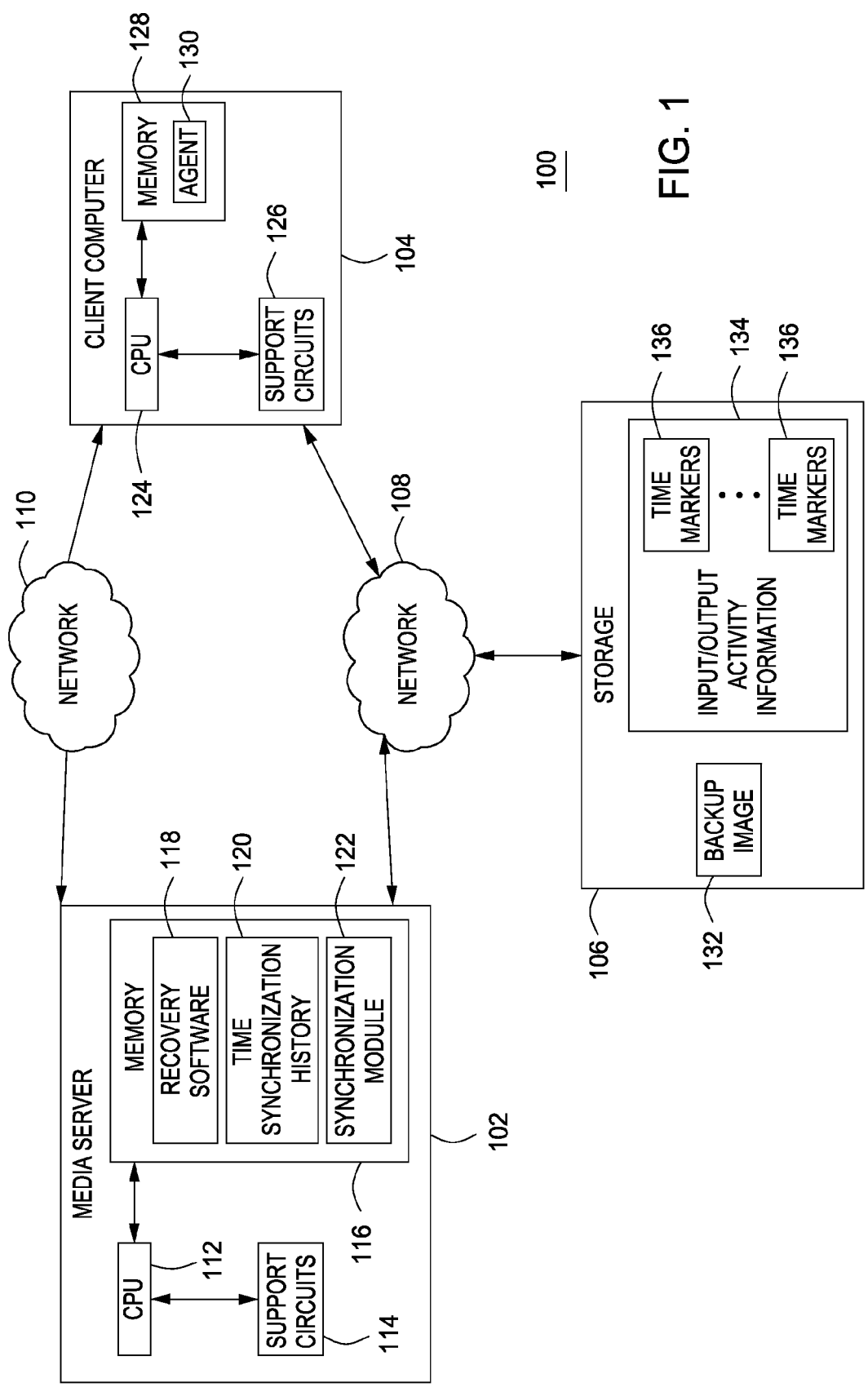
FIG. 1 is a system for providing time synchronization in order to recreate an accurate storage state according to one or more embodiments of the present invention.

FIG. 1 is a system 100 for providing time synchronization in order to recreate an accurate storage state according to one or more embodiments of the present invention. The system 100 comprises a media server 102, a client computer 104, a storage 106, where each is coupled to each other through a network 108. The system 100 may include a data protection system for a computer environment that includes the client computer 104. Furthermore, the media server 102 is coupled to the client computer 104 and the computing environment through a network 110 (e.g. a Local Area Network).

The media server 102 is a computing device (e.g., a laptop, a desktop, a Personal Desk Assistant (PDA), a tablet, a mobile phone and the like) that comprises a central processing unit (CPU) 112, various support circuits 114 and a memory 116. The CPU 112 may comprise one or more commercially available microprocessors or microcontrollers that facilitate data processing and storage. Various support circuits 114 facilitate operation of the CPU 112 and may include clock circuits, buses, power supplies, input/output circuits and/or the like. The memory 116 includes a read only memory, random access memory, disk drive storage, optical storage, removable storage, and the like. The memory 116 includes various data, such as a time synchronization history 120. The memory 116 includes various software packages, such as recovery software 118 and a synchronization module 122. Generally, the recovery software 118 includes software code for providing a point-in-time image to the client computer 104 as a source for data recovery.

The client computer 104 is a computing device (e.g., a laptop, a desktop, a Personal Desk Assistant (PDA), a tablet, a mobile phone and the like) that comprises a central processing unit (CPU) 124, various support circuits 126 and a memory 128. The CPU 124 may comprise one or more commercially available microprocessors or microcontrollers that facilitate data processing and storage. Various support circuits 126 facilitate operation of the CPU 124 and may include clock circuits, buses, power supplies, input/output circuits and/or the like. The memory 114 includes a read only memory, random access memory, disk drive storage, optical storage, removable storage, and the like. The memory 128 includes various software packages, such as an agent 130.

The storage 106 may include a data storage system (e.g., one or more storage devices) that includes a backup image 132 and input/output activity information 134. Generally, the backup image 132 includes one or more image files for representing a volume at a particular point-in-time. In addition, the input/output activity information 134 may be an I/O stream or journal of storage and/or file system operations for the volume after the particular point-in-time. Accordingly, the storage and/or file system operations may be applied to the backup image 132 in order to create a point-in-time image that corresponds with a later point-in-time. Furthermore, the input/output activity information comprises time marker 136 for storing a local time at the client computer 104 as explained further below.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, Fibre Channel, General Packet Radio Service (GPRS), and the like. In one embodiment, the network 108 forms a storage area network (SAN) that includes the media server 102 and the storage 106. As such, the network 108 may be used to communicate storage traffic between the client computer 104 and the media server 102. Furthermore, the network 110 may be a local area network (LAN) for a computing environment that includes the client computer 104.

According to one or more embodiments, the media server 102 and the client computer 104 cooperate to provide time synchronization within the system 100 in order to enable accurate storage state recreation. In one embodiment, the agent 130 inserts the time markers 136 into the input/output activity information 134 (e.g., an I/O journal or stream that comprises one or more storage and/or file system operations) on a periodic basis (e.g., every fifteen minutes). The time markers 136 may have known positions that are relative to the one or more storage and/or file system operations in the I/O stream. For example, the time markers 136 may be inserted into the I/O stream such that each time marker is positioned before and/or after an occurrence of a storage and/or file system operation.

In another embodiment, the input/output activity information 134 is transmitted to the media server 102 for processing before storage in the storage 106. Since the input/output activity information 134 (e.g., I/O stream) may be transmitted in-band (i.e., over the same transport), positions of the time markers 136 are maintained. At the media server 102, the input/output activity information 134 is modified to include a server timestamp for each local client timestamp. Subsequently, a time skew between the media server 102 and the client computer 104 is determined. In one embodiment, the time skew is a difference in time between a recordation of a time marker at the client computer 104 and a reception of the time marker at the media server 102. As explained below, the time skew may be stored in the time synchronization history 120.

In operation, the synchronization module 122 processes each segment (e.g., each storage and/or file system operation) of the input/output information 134 to identify the time markers 136. Upon identification of a time marker of the time markers 136, the synchronization module generates a server timestamp in order to update the time marker of the time markers 136. In one embodiment, the synchronization module 122 stores the server timestamp with the local client timestamp associated with the client computer 104. For example, the media server 102 executes a function that returns the system time (e.g., SystemTime( ). It is appreciated that the embodiments of the present invention may include operating systems with different methods for obtaining system timestamps. In another embodiment, the synchronization module 122 computes the time skew between the media server 102 and the client computer 104 and stores the time skew in the time marker of the time markers 136 and/or the time synchronization history 120.

Occasionally, the client computer 104 desires to recover lost, corrupted or deleted data at a particular point-in-time from the backup image 132 and the input/output information 134. According to one or more embodiments, the client computer 104 communicates a point-in-time image request to the recovery software 118, which accesses the backup image 132 and uses the synchronization module 122 to determine an accurate time skew. The recovery module 118 adjusts the particular point-in-time by the accurate time skew in order to be consistent with a server time at the media server 102. Hence, the recovery module 118 provides a point-in-time consistent image to the client computer 104 as a source for data recovery.

In one embodiment, the synchronization module 122 identifies a particular time marker of the time markers 136 that is temporally closest to the particular point-in-time and/or is associated with the client computer 104. The server timestamp at the particular time marker of the time markers 136 is used to determine the accurate time skew. Hence, the local client timestamp associated with the client computer 104 maps to the local client timestamp associated with the media server 102. In other words, one or more storage and/or file system operations within the input/output activity information 134 are actually associated with a point-in-time that is an adjustment of the particular point-in-time by the accurate time skew to account for a time difference between the media server 102 and the client computer 104.

For example, the client computer 104 may request a point-in-time image with image time of "05/14/2008 3:10:00.000000 pm". The media server 102 may use the synchronization module 122 to identify a time skew that existed at the image time of "5/14/2008 3:10:00.000000 pm" by referencing a time marker created by the client computer at 3:00 pm on May 14, 2008. Using the time skew from the time marker as an accurate time skew, the media server 102 may accurately map the image time of "5/14/2008 3:10:00:000000 pm" on the client computer to a local server time at that precise instant. For example, the time marker may indicate the accurate time skew to be 0.5 seconds. As such, the image time of "5/14/2008 3:10:00:000000 pm" maps to an image time of "5/14/2008 3:10:00:500000 pm" at the media server 102.

In one embodiment, the synchronization module 122 may examine the time synchronization history to determine the accurate time skew for the client computer 104. In another embodiment, the synchronization module 122 correlates various portions of the time synchronization history 120. Generally, the time synchronization history 120 indicates one or more computed time skews for a plurality of client computers. Accordingly, a particular client computer may be associated with an average time skew, which may be used as the accurate time skew for a point-in-time image request. In another embodiment, the synchronization module 122 determines the accurate time skew for the particular client computer using a statistical analysis (e.g., a regression analysis). For example, one or more outlier time skew computations may significantly affect the accurate time skew. As such, the synchronization module 122 determines the accurate time skew that take the one or more outlier time skews into account.

Furthermore, since identification information of the plurality of client computers (e.g., Internet Protocol Address, hostname and/or the like) is also stored in the time markers 136, the media server 102 may differentiate between time markers created by different client computers. Thus, the different client computers can specify a point-in-time relative to a time marker. For example, instead of specifying an image time of "5/14/2008 19:20:00:000000", the client computer 104 may specify the same my_marker_5/14/2008@19:00:00+00:20:00.000000 as an adjusted point-in-time for data recovery. Because the media server 102 permits the plurality of client computers to specify time markers is that one client computer may now use one or more time markers created by another client computer. In an embodiment where one client computer has failed (e.g., a failover scenario), another client computer can recreate an accurate storage state from the point of view of the failed client computer.

Figure 2:
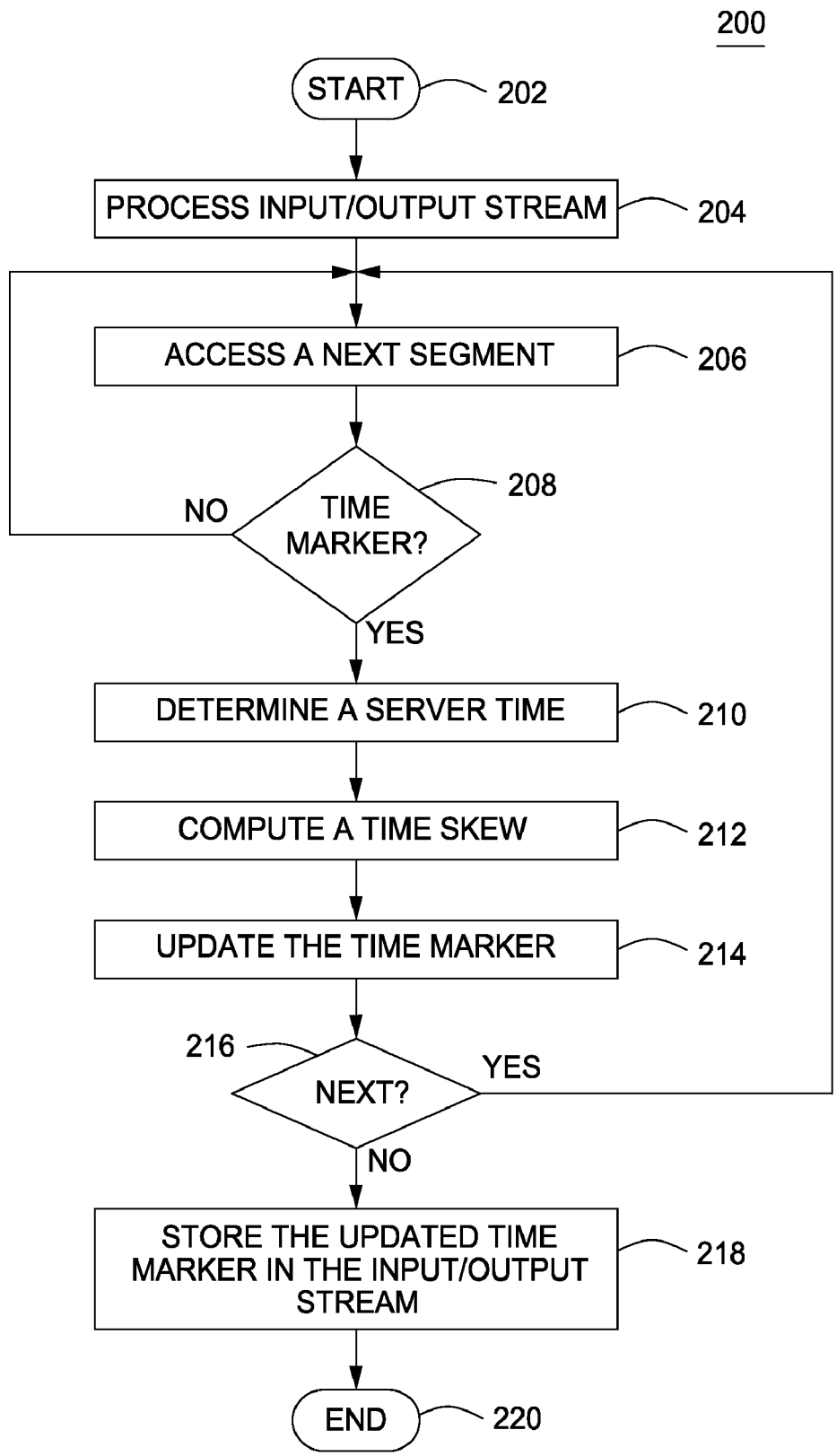
FIG. 2 is a method for providing time synchronization within a data protection system in order to recreate an accurate storage state according to one or more embodiments of the present invention.

FIG. 2 is a method 200 for providing time synchronization within a data protection system in order to recreate an accurate storage state according to one or more embodiments of the present invention. The method 200 starts at step 202 and proceeds to step 204 where the input/output stream is processed. In one embodiment, the input/output stream comprises a plurality of segments (e.g., one or more storage and/or file system operations and one or more time markers).

At step 206, a next segment of the input/output stream is accessed. At step 208, a determination is made as to whether the next segment is a time marker. If the next segment is not a time marker, then the method 200 returns to step 206 where a next segment is accessed. If the next segment is a time marker, then the method 200 proceeds to step 210. At step 210, a server time is determined. In one embodiment, the function "SystemTime( )" provides the server time. In another embodiment, a system clock may be directly accessed in order to obtain the server time. At step 212, a time skew is computed. In one embodiment, the time skew is a time difference between the server time and a local client timestamp of a client computer that is extracted from the time marker.

At step 214, the time marker is updated with the server time and stored in the input/output stream. At step 216, a determination is made as to whether there is a next segment in the input/output stream. If there is a next segment, the method 200 returns to step 206 where the next segment is accessed. If there is no next segment, the method 200 proceeds to step 218. At step 218, the updated input/output stream is stored (e.g., in storage 106 of FIG. 1). At step 220, the method 200 ends.

Figure 3:
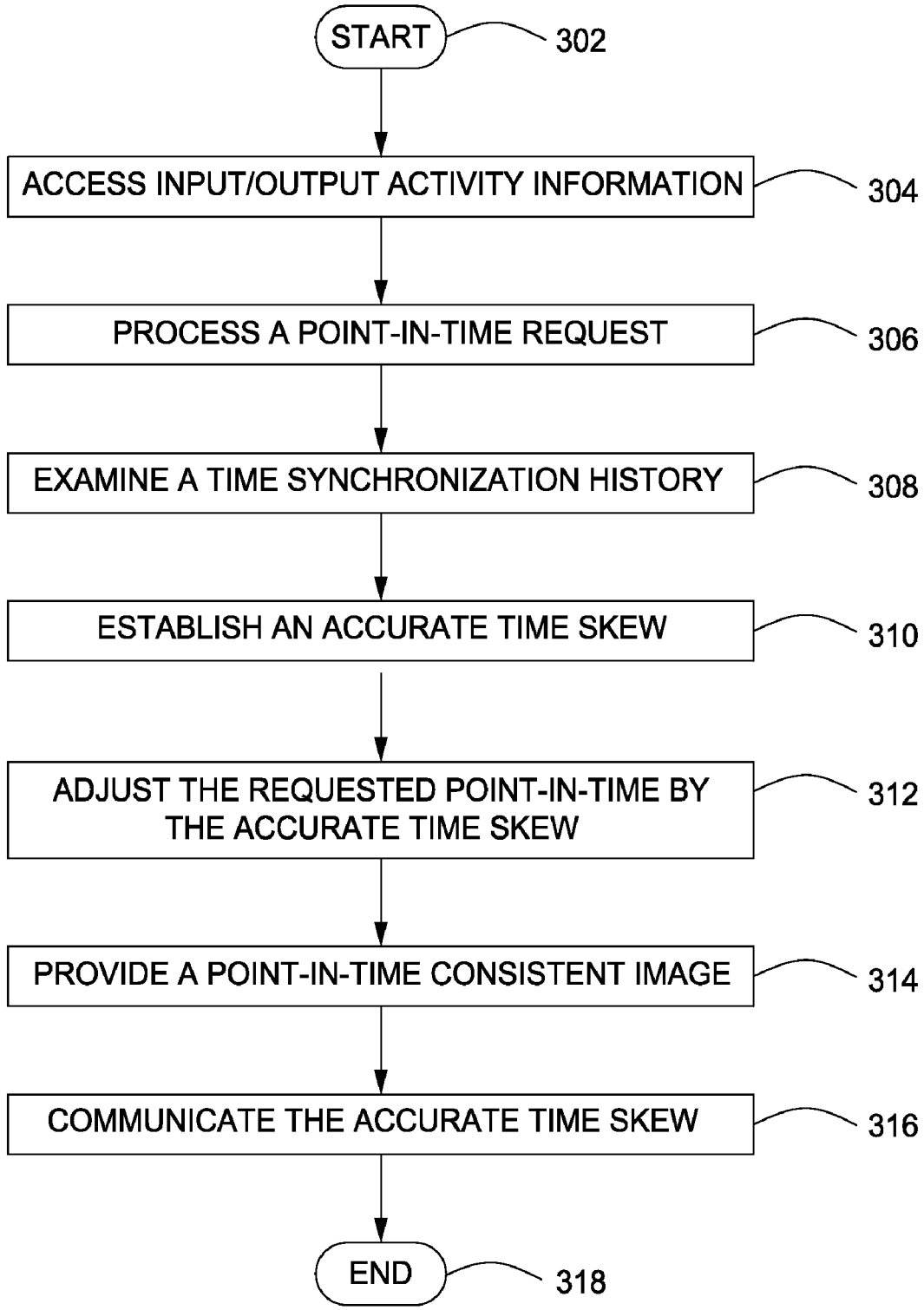
FIG. 3 is a method for establishing an accurate time skew to provide a point-in-time consistent image according to one or more embodiments of the present invention.

FIG. 3 is a method 300 for establishing an accurate time skew to provide a point-in-time consistent image according to one or more embodiments of the present invention. The method 300 starts at step 302 and proceeds to step 304 where input/output activity information accessed.

At step 306, a point-in-time image request from a client computer is processed. At step 308, a time synchronization history is examined. At step 310, an accurate time skew is established. At step 312, the requested point-in-time is adjusted by the accurate time skew. At step 314, a point-in-time consistent image is provided to the client computer. At step 316, the accurate time skew is communicated to the client computer. At step 318, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for synchronizing time within a data protection system, comprising:
    receiving, by at least one server computer, at least one time marker having at least one local client timestamp, wherein the at least one time marker is contained in input/output activity information for at least one file system operation associated with at least one client computer, and wherein the at least one time marker is contained in the input/output activity information in a specified position relative to an indication of the file system operation;
    determining, by the at least one server computer, at least one server timestamp for the at least one local client timestamp;
    computing at least one time skew between the at least one local client timestamp and the at least one server timestamp; and
    modifying the input/output activity information using the at least one computed time skew.

2. The method of claim 1 further comprising:
    processing a point-in-time image request from a particular client computer; and
    establishing an accurate time skew for the requested point-in-time image using the at least one server timestamp and the at least one local client timestamp.

3. The method of claim 2 further comprises communicating the accurate time skew to the particular client computer.

4. The method of claim 2 further comprises adjusting the requested point-in-time image by the accurate time skew.

5. The method of claim 2, wherein establishing the accurate time skew further comprises mapping a server timestamp to a local client timestamp relative to the requested point-in-time image.

6. The method of claim 1, wherein determining, by the at least one server computer, at least one server timestamp for the at least one local client timestamp further comprises updating a particular time marker of the at least one time marker with a server timestamp of the at least one server timestamp that indicates a reception at a server of the particular time marker of the at least one time marker.

7. The method of claim 1 further comprises generating time synchronization history using the at least one time skew.

8. The method of claim 7 further comprising correlating various portions of the time synchronization history to determine at least one accurate time skew for at least one point-in-time.

9. An apparatus for synchronizing time within a data protection system, comprising:
    a memory, within a corvor computer, comprising input/output activity information associated with at least one client computer, wherein the input/output activity information comprises at least one time marker having at least one local client timestamp, the at least one time marker located in the input/output activity information in a specified position relative to a file system operation;
    a synchronization module, within the server computer, configured to:
        modify the at least one time marker with at least one time skew, wherein the time skew is computed between at least one server time stamp and the at least one local client timestamp;
        modify the at least one time marker with at least one server timestamp, wherein each server timestamp of the at least one server timestamp is generated upon reception of each time marker of the at least one time marker.

10. The apparatus of claim 9 further comprising at least one agent for inserting the at least one time marker into the input/output activity information at the at least one client computer.

11. The apparatus of claim 9 further comprising time synchronization history that indicates at least one time skew and a client computer of the at least one client computer that are associated with at least one time marker.

12. The apparatus of claim 9 further comprising recovery software for processing a point-in-time image request from a client computer of the at least one client computer, wherein the synchronization module establishes an accurate time skew to adjust the requested point-in-time image.

13. The apparatus of claim 12, wherein the synchronization module identifies a particular time marker relative to the requested point-in-time to determine the accurate time skew.

14. The apparatus of claim 13, wherein the recovery software provides a point-in-time image to another client computer that is adjusted according to the accurate time skew of the client computer.

15. The apparatus of claim 12, wherein the point-in-time image request indicates a particular time marker to use to determine the accurate time skew.

16. A system for synchronizing time within a data protection system, comprising:
   at least one client computer, where each client computer comprises:
   an agent for inserting at least one time marker into input/output activity information, wherein the at least one time marker having at least one local client timestamp, the at least one time marker located in the input/output activity information in a specified position relative to a file system operation; and
   a media server coupled to the at least one client computer, comprising:
   a synchronization module configured to:
      modify the at least one time marker with at least one time skew, wherein the time skew is computed using at least one server timestamp for the at least one local client timestamp; and
      modify the at least one time marker with at least one server timestamp, wherein each server timestamp of the at least one server timestamp is generated upon reception of each time marker of the at least one time marker.

17. The system of claim 16 further comprising recovery software for processing a point-in-time image request from a client computer of the at least one client computer, wherein the synchronization module establishes an accurate time skew to adjust the requested point-in-time.

18. The system of claim 17, wherein the synchronization module identifies a particular time marker relative to the requested point-in-time to determine the accurate time skew.

* * * * *